United States Patent
Altalef et al.

(10) Patent No.: US 9,319,939 B2
(45) Date of Patent: Apr. 19, 2016

(54) METHOD AND APPARATUS FOR HANDLING CALL DEGRADATION DURING CALL SETUP

(71) Applicant: Marvell World Trade Ltd., St. Michael (BB)

(72) Inventors: Binyamin Altalef, Shoham (IL); David Ben-Eli, Modiin (IL); Gil Levy, Ramat Gan (IL); Amit Rahav, Karkur (IL); Dekel Guterman, Peduel (IL); Danny Alexander, Neve Efraim Monoson (IL)

(73) Assignee: Marvell World Trade Ltd., St. Michael (BB)

( * ) Notice: Subject to any disclaimer, the term of this patent is extended or adjusted under 35 U.S.C. 154(b) by 43 days.

(21) Appl. No.: 14/078,712

(22) Filed: Nov. 13, 2013

(65) Prior Publication Data
US 2014/0135011 A1    May 15, 2014

Related U.S. Application Data

(60) Provisional application No. 61/726,191, filed on Nov. 14, 2012.

(51) Int. Cl.
| | |
|---|---|
| *H04W 36/00* | (2009.01) |
| *H04W 4/00* | (2009.01) |
| *H04W 24/00* | (2009.01) |
| *H04L 12/28* | (2006.01) |
| *H04W 68/00* | (2009.01) |
| *H04W 76/02* | (2009.01) |

(52) U.S. Cl.
CPC ............ *H04W 36/00* (2013.01); *H04W 76/027* (2013.01)

(58) Field of Classification Search
CPC ..... H04W 36/06; H04W 36/18; H04W 52/24; H04W 52/40
See application file for complete search history.

(56) References Cited

U.S. PATENT DOCUMENTS

| | | | |
|---|---|---|---|
| 2004/0042396 A1* | 3/2004 | Brown et al. | 370/227 |
| 2004/0214575 A1* | 10/2004 | Jovanovic | H04W 36/04 455/444 |
| 2005/0030895 A1 | 2/2005 | Zeira et al. | |
| 2005/0054368 A1 | 3/2005 | Amerga | |
| 2006/0019675 A1* | 1/2006 | Miyajima | H04W 88/02 455/456.1 |
| 2008/0242321 A1* | 10/2008 | Inoue | H04W 48/12 455/458 |
| 2011/0053588 A1 | 3/2011 | Al-Khudair et al. | |
| 2011/0145639 A1 | 6/2011 | Farahmand et al. | |
| 2012/0252446 A1* | 10/2012 | Reial et al. | 455/434 |

FOREIGN PATENT DOCUMENTS

WO    2011103745 A1    9/2011

OTHER PUBLICATIONS

3GPP TS 25.133, Universal Mobile Telecommunications System (UMTS);Requirements for support of radio resource management (FDD), version 10.10.0, Release 10, Section 4.2.2., Jul. 2013.
3GPP TS 25.303, "Universal Mobile Telecommunications System (UMTS); Interlayer procedures in Connected Mode" version 10.0.0, Release 10, Section 6.1, Mar. 2011.
3GPP TS 25.331, "Universal Mobile Telecommunications System (UMTS);Radio Resource Control (RRC);Protocol specification", version 10.3.1, Release 10, Section 8.1.3 and Annex B, May 2011.
International Application # PCT/IB2013/060114 Search Report dated Apr. 9, 2014.

\* cited by examiner

*Primary Examiner* — Tammy Pham
*Assistant Examiner* — Frantz Bataille

(57) ABSTRACT

A method includes, in a mobile communication terminal, detecting degradation in communication quality between the terminal and a serving base station during establishment of a call via the serving base station. During the establishment of the call via the serving base station, the terminal searches for an alternative base station that is suitable for establishing the call. Upon finding the alternative base station, a switch is made to establish the call via the alternative base station.

18 Claims, 2 Drawing Sheets

METHOD AND APPARATUS FOR HANDLING CALL DEGRADATION DURING CALL SETUP

CROSS-REFERENCE TO RELATED APPLICATIONS

This application claims the benefit of U.S. Provisional Patent Application 61/726,191, filed Nov. 14, 2012, whose disclosure is incorporated herein by reference.

FIELD OF THE DISCLOSURE

The present disclosure relates generally to wireless communication, and particularly to methods and systems for recovery from call setup failures.

BACKGROUND

Various cellular communication standards specify procedures for setting up calls via a cellular network. Call establishment in Universal Mobile Telecommunications System (UMTS) networks is specified by the Third Generation Partnership Project (3GPP), for example in Section 6.1 of "Technical Specification Group Radio Access Network; Interlayer procedures in Connected Mode (Release 10)," TS 25.303, version 10.0.0, March, 2011, which is incorporated herein by reference.

Examples of call establishment procedures for UMTS networks are provided, for example, in Section 8.1.3 and Annex B of "Technical Specification Group Radio Access Network; Radio Resource Control (RRC); Protocol specification (Release 10)," TS 25.331, version 10.3.1, April, 2011, which is incorporated herein by reference.

The description above is presented as a general overview of related art in this field and should not be construed as an admission that any of the information it contains constitutes prior art against the present patent application.

SUMMARY

An embodiment that is described herein provides a method including, in a mobile communication terminal, detecting degradation in communication quality between the terminal and a serving base station during establishment of a call via the serving base station. During the establishment of the call via the serving base station, the terminal searches for an alternative base station that is suitable for establishing the call. Upon finding the alternative base station, a switch is made to establish the call via the alternative base station.

In some embodiments, searching for the alternative base station includes attempting to receive the alternative base station in at least one time interval, even though a communication protocol used for communicating between the terminal and the serving base station does not assign any time resources for finding alternative base stations during the establishment of calls. In an embodiment, searching for the alternative base station includes attempting to receive the alternative base station in at least one time interval that is uncoordinated with the serving base station.

In some embodiments, searching for the alternative base station includes continuing to attempt establishment of the call via the serving base station in parallel with searching for the alternative base station. In an example embodiment, the method includes, in response to recovery of the degradation, aborting searching for the alternative base station and reverting to establish the call via the serving base station. In an alternative embodiment, searching for the alternative base station includes aborting the establishment of the call via the serving base station.

In another embodiment, searching for the alternative base station includes switching from a frequency used for receiving the serving base station to an alternative frequency for receiving the alternative base station. In an example embodiment, switching to the alternative frequency includes switching to an alternative frequency band. Additionally or alternatively, searching for the alternative base station includes switching from a Radio Access Technology (RAT) used for communicating with the serving base station to an alternative RAT for receiving the alternative base station.

In yet another embodiment, detecting the degradation in the communication quality includes detecting that a reception quality of a signal transmitted by the serving base station is below a predefined quality threshold for more than a predefined time duration. In still another embodiment, detecting the degradation in the communication quality includes detecting that the establishment of the call via the serving base station does not complete within a predefined time duration. In another embodiment, detecting the degradation in the communication quality includes detecting that an error rate of a signal transmitted by the serving base station is above a predefined error-rate threshold.

There is additionally provided, in accordance with an embodiment that is described herein, apparatus including a transceiver and processing circuitry. The transceiver is configured to communicate with base stations. The processing circuitry is configured to detect a degradation in communication quality with a serving base station during establishment of a call via the serving base station, to search, during the establishment of the call via the serving base station, for an alternative base station that is suitable for establishing the call, and, upon finding the alternative base station, to switch to establish the call via the alternative base station.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
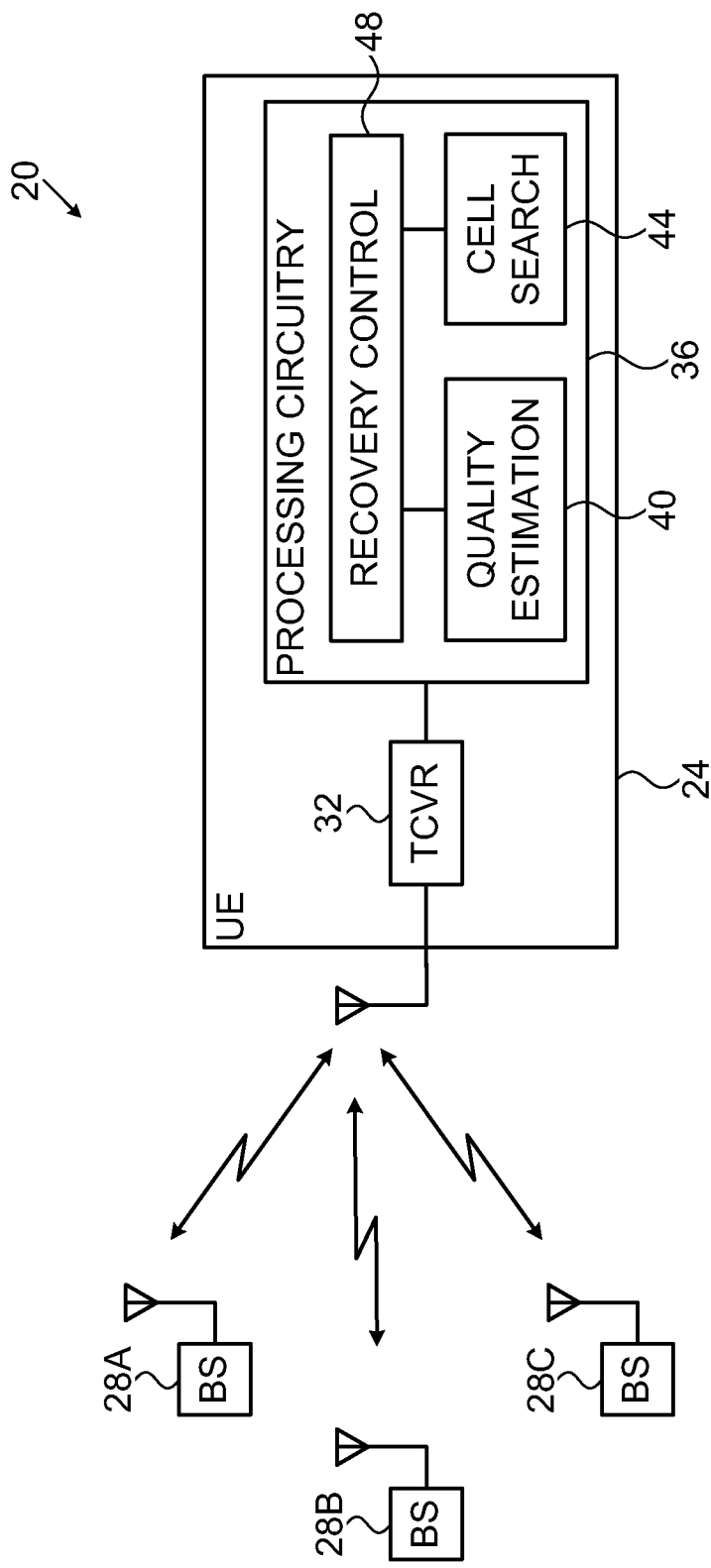
FIG. 1 is a block diagram that schematically illustrates a cellular communication system, in accordance with an embodiment that is described herein.

In a typical cellular communication network, a mobile communication terminal establishes a call by carrying out a call setup process vis-à-vis its serving base station. In UMTS, for example, call setup is defined as the transition to CELL-_DCH state. Call setup is also referred to as call establishment. As specified in section 6.1 of 3GPP TS 25.303, cited above, the RRC layer in the UE initiates RRC connection establishment by sending an RRC Connection Request message. On the network side, upon the reception of RRC Connection Request, the RRC layer performs admission control, assigns an s-RNTI for the RRC connection and selects radio resource parameters. If a DCH is to be established, CPHY- RL-Setup and CPHY-TrCH-Config request primitives are sent to all NodeBs that would be involved in the channel establishment. The physical layer operation is started and confirmation primitives are returned from each Node B. RRC configures parameters on layer 2 to establish the DCCH logical channel locally. The selected parameters are transmitted to the UE in an RRC Connection Setup message. Upon reception of the RRC Connection Setup message, the RRC layer in the UE configures L1 and L2 using these parameters to locally establish the DCCH logical channel. In case of DCH, layer 1 indicates to RRC when it has reached synchronization. The RLC signaling link is locally established on both sides. When the UE has established the RLC signaling link, it transmits an RRC Connection Setup Complete message to the network.

In some communication protocols, such as in the various 3GPP standards, there are time periods in the call setup process that do not include any mechanism or resource assignment for the terminal to receive signals or otherwise obtain information regarding neighbor base stations (at least for base stations that differ in frequency from the serving base station). Therefore, even if the quality of communication with the serving base station deteriorates during the call setup process, the terminal has no alternative but to continue the process until it succeeds or fails.

In other words, call setup is a sensitive period in which the terminal is forced to communicate with the serving cell regardless of communication quality (possibly with the exception of a neighbor base station that operates on the same frequency as the serving base station). In practice, however, call setup is often lengthy, e.g., when the UE does not receive any response from the network, which may imply that the network cannot receive the UE's signals or vice versa. Communication quality with the serving base station may degrade considerably during the process.

As a result, recovery from conventional call setup is extremely long. Even if the terminal succeeds in setting up a call via a marginal-quality serving base station, the call quality will usually be poor and the call is likely to disconnect. In either case, the fact that the terminal is conventionally unable to receive neighbor base stations during the call setup process results in degraded performance and poor user experience.

Embodiments that are described herein provide improved methods and systems for recovering from call setup failures. The disclosed techniques enable the terminal to search for alternative base stations on frequencies and Radio Access Technologies (RATs) not used by the serving base station during the call setup process, and switch to an alternative base station if necessary.

In some embodiments, upon detecting a degradation in communication quality with the serving base station during call setup, the terminal initiates a search for an alternative base station that is suitable for setting up the call. If a suitable alternative base station is found, the terminal switches over to the alternative base station and continues the call setup process, typically aborting the last recovery attempt with the serving base station.

In some embodiments, the search for an alternative base station is performed during times in which the terminal is expected to continue attempting to receive the serving base station. As part of the search, the terminal typically switches its receiver to a different frequency and/or different Radio Access Technology (RAT). Therefore, the search may cause some degradation in the success probability of call setup via the serving base station. This degradation is usually tolerable, especially since communication quality with the serving base station is poor to begin with.

In summary, the methods and systems described herein enable the terminal to switch to an alternative base station during call setup when needed. As such, the disclosed techniques reduce call setup time, reduce the likelihood of call setup failure, reduce the likelihood of call drop due to call setup success with a marginal base station, and thus improve user experience.

FIG. 1 is a block diagram that schematically illustrates a cellular communication system 20, in accordance with an embodiment that is described herein. In the example of FIG. 1 system 20 comprises a mobile communication terminal 24 and three Base Stations (BSs) 28A . . . 28C. Different BSs typically operate on different frequencies, and possibly using different RATs.

In the present example system 20 operates in accordance with the UMTS specifications, cited above. UMTS is also referred to as Universal Terrestrial Radio Access (UTRA) or Wideband Code Division Multiple Access (WCDMA). Alternatively, system 20 may operate in accordance with any other suitable cellular communication standard, such as Global System for Mobile communications (GSM), Evolved UTRA (E-UTRA) that is also referred to as Long Term Evolution (LTE), or LTE-Advanced (LTE-A). Depending on the applicable standard, terminal 24 is also referred to as Mobile Station (MS) or User Equipment (UE). The base stations are also referred to as cells, BTSs, NodeBs or eNodeBs.

At a given time, one of the base stations is defined as the serving cell of UE 24, and the other base stations are regarded as neighbor cells. FIG. 1 shows only a single terminal and three cells, for the sake of clarity. Real-life scenarios, however, often involve multiple terminals and multiple cells.

In the embodiment of FIG. 1, UE 24 comprises one or more antennas for receiving downlink signals from the base stations and for transmitting uplink signals to the base stations, a transceiver (transmitter-receiver or TCVR) 32, and processing circuitry 36.

Transceiver 32 down-converts received Radio Frequency (RF) downlink signals, up-converts uplink signals to RF for transmission, and typically performs additional functions such as amplification, filtering and gain control. Processing circuitry 36 carries out the various digital processing tasks of the UE. In the present context, however, only the elements relating to call setup are shown and described, for the sake of clarity.

In some embodiments, processing circuitry 32 comprises a quality estimation unit 40, a cell search unit 44 and a recovery control unit 48. Quality estimation unit 40 is configured to estimate the quality of communication with various base stations. In an embodiment, unit 40 estimates the quality of received downlink signals. In other embodiments, unit 40 estimates the quality of uplink communication, for example by detecting success or failure of Physical Random Access Channel (PRACH) procedure by the UE. Cell search unit 44 is configured to search for alternative cells for the UE to communicate with. Recovery control unit 48 is configured to recover from call setup failures using methods that are described in detail below.

The UE configuration shown in FIG. 1 is an example configuration, which is depicted solely for the sake of clarity. In alternative embodiments, any other suitable UE configuration can be used. For example, the functional partitioning among units 40, 44 and 48 in processing circuitry 36 is given purely by way of example. In alternative embodiments, the recovery-related tasks of the processing circuitry may be performed using any other suitable configuration of any desired number of units.

Some UE elements that are not mandatory for understanding of the disclosed techniques have been omitted from the figures for the sake of clarity. The different UE elements are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some UE elements may be implemented using software executing on programmable hardware, or using a combination of hardware and software elements.

When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory. In some embodiments, some elements of UE 24 may be fabricated in a chip-set.

In some embodiments, when a call is to be established for UE 24, the UE and the serving cell carry out a call setup procedure. In a UMTS network, for example, the UE is initially camped on the serving cell and is a state such as RRC Idle state, CELL_PCH/URA_PCH or CELL_FACH. When a call is to be established (initiated either by the UE or by another party to the call), UE 24 carries out a call setup process that transitions the UE to RRC Connected state.

In many practical scenarios, the call setup process is lengthy and communication quality between UE 24 and the serving cell may deteriorate during the process. In some embodiments, processing circuitry 36 of UE 24 detects the degradation, and initiates a search for an alternative cell with which to establish the call.

In the example of FIG. 1, quality estimation unit 40 measures the quality of communication with the serving cell during call setup. If the communication quality falls below some predefined threshold, recovery control unit 48 invokes cell search unit 44 to search for an alternative cell. If a suitable alternative cell is found, recovery control unit 48 initiates selection or reselection to the found cell, and establishes the call with that cell.

In various embodiments, recovery control unit 48 uses various criteria for detecting degradation of communication quality with the serving cell. In one embodiment, unit 48 detects degradation if the quality of the downlink signal received from the serving cell falls below some quality threshold. The quality can be quantified using, for example, chip-energy to noise-density ratio ($E_c/I_0$) on a Common Pilot Channel (CPICH), Signal to Interference and Noise Ratio (SINR), or Received Signal Code Power (RSCP) on the CPICH. The quality measures above are listed purely by way of example, and any other suitable measure may be used in alternative embodiments. In an embodiment, when such a measure falls below a predefined threshold for more than a predefined time period (e.g., two seconds), unit 48 regards this event as a degradation that warrants searching for an alternative cell on a different frequency and/or RAT.

In one example embodiment, recovery control unit 48 declares degradation upon expiry of a timer that expires when $E_c/I_0$ is below a predefined threshold for more than $N_{serv}$. (DRX_CYCLE_PERIOD), wherein DRX_CYCLE_PERIOD denotes the length of the Discontinuous Reception (DRX) period defined for the UE. The parameter $N_{serv}$ is defined in section 4.2.2 of 3GPP Technical Specification 25.133, entitled "Technical Specification Group Radio Access Network; Requirements for support of radio resource management (FDD) (Release 10)," TS 25.133, version 10.10.0, July, 2013, which is incorporated herein by reference.

In alternative embodiments, recovery control unit 48 declares degradation if the call setup process is not concluded successfully within a predefined time period. In other embodiments, recovery control unit 48 declares degradation if the downlink error rate (e.g., Block Error Rate—BLER) on the call establishment channel is higher than a predefined threshold. Further alternatively, unit 48 may detect degradation in communication quality with the serving cell using any other suitable criterion.

Upon detecting the degradation in quality, recovery control unit 48 decides to allocate resources for searching for an alternative cell on different frequencies. Typically, the decision and the subsequent search are uncoordinated with the serving cell. From the point of view of the serving cell, the UE is typically expected to dedicate all its time resources for setting up the call via the serving cell. In other words, the applicable communication protocol does not allocate time resources (e.g., time gaps) for receiving neighbor cell signals on frequencies that differ from the frequency used by the serving base station during the call setup procedure.

By deciding to allocate some time resources for searching for an alternative cell, the UE increases the likelihood of missing signaling messages from the serving cell because of the need to switch its reception circuitry to other frequencies. As a result, the probability of failing to establish the call via the serving cell increases. In various embodiments, unit 48 allocates different fractions of the available time resources for the alternative cell search, in view of the above-described trade-off.

In one extreme embodiment, unit 48 uses all available time resources for searching for an alternative cell on a different frequency (and possibly a different RAT). This solution increases the likelihood of finding a suitable alternative cell, but means that the call setup with the serving cell is most likely to fail. At the other extreme, unit 48 uses most of the available time for continuing to receive the serving cell, and only minimal time resources for searching for an alternative cell on a different frequency (and possibly different RAT). This solution performs well if the communication quality with the serving cell recovers, but means a low probability of finding a suitable alternative cell. Intermediate solutions are also feasible.

Thus, unit 48 typically continues to attempt to establish the call via the serving cell while searching for a suitable alternative cell, in an embodiment. If communication quality with the serving cell improves, unit 48 typically aborts the search and establishes the call via the serving cell.

After deciding to search for an alternative cell, recovery control unit 48 typically invokes cell search unit 44 to perform the search. Searching for an alternative cell typically involves switching to one or more different frequencies (different from the frequency used by the serving cell), and attempting to receive signals from alternative cells on these frequencies. The alternative frequencies may be on the same frequency band as the frequency of the serving cell, or on one or more different frequency bands. The alternative cells may be of the same RAT as the serving cell or of a different RAT.

In some embodiments, processing circuitry 36 exploits prior information regarding neighbor cells to improve the search. Such prior information may comprise, for example, frequencies that UE 24 has previously received in neighbor cell lists from the serving cell, frequencies of alternative cells that UE 24 has found in previous searches and stored in memory, or any other suitable frequencies.

In some embodiments, cell search unit 44 searches on these previously-obtained frequencies first, so as to increase the likelihood of finding a suitable alternative cell. In some embodiments the frequencies are sorted in accordance with some suitable quality metric.

In an embodiment this list of frequencies also comprises the frequency of the current serving cell whose quality has just deteriorated. In some embodiments the search involves switching to a different Radio Access Technology (RAT) than the RAT of the serving cell. Switching to a different frequency and/or RAT typically involves controlling transceiver 32.

Upon finding a suitable alternative cell, processing circuitry 36 initiates cell selection or reselection to the alternative cell. After successful selection/reselection, the processing circuitry establishes the call via the alternative cell, which becomes the serving cell of the UE. Typically, the user of UE 24 is unaware of the switch-over process, and has no need to initiate or control it in any way.

Figure 2:
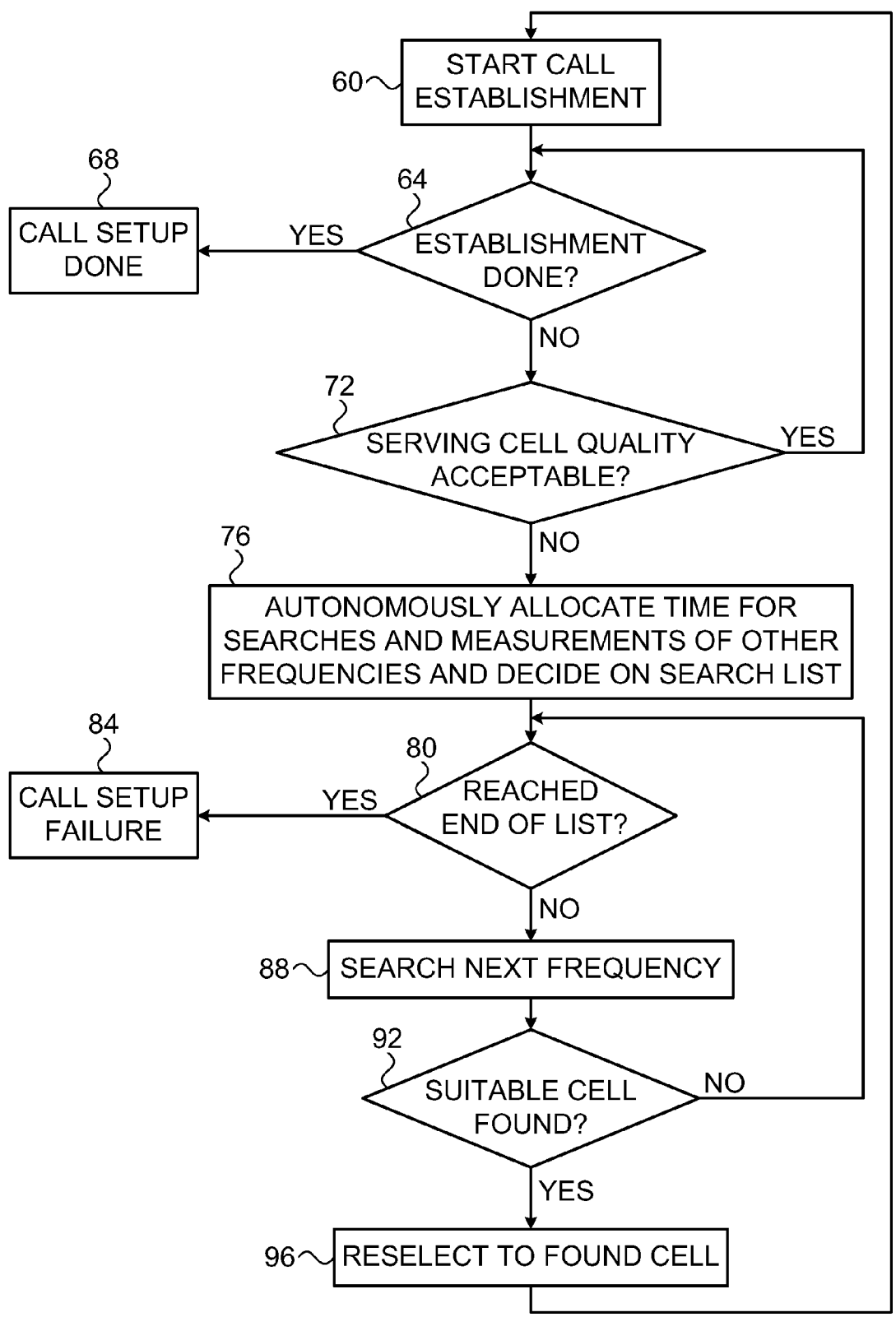
FIG. 2 is a flow chart that schematically illustrates a method for recovery from call setup failures, in accordance with an embodiment that is described herein.

FIG. 2 is a flow chart that schematically illustrates a method for recovery from call setup failures, in accordance with an embodiment that is described herein. The method begins with processing circuitry 36 of UE 24 starting a call setup process via the serving cell, at a call setup operation 60. The processing circuitry checks whether the call setup process is completed successfully, at a setup checking operation 64. If successful, the method terminates, at a success termination operation 68.

Otherwise, processing circuitry 36 checks whether the quality of communication with the serving cell is acceptable or not, at a quality checking operation 72. If acceptable, the method loops back to operation 64 above and the processing circuitry continues the call setup process via the serving cell.

If the quality of communication with the serving cell is not acceptable, processing circuitry allocates time resources for search and measurement of alternative cells on alternative frequencies and/or RATs, at a search initialization operation 76. Typically, the processing circuitry generates a search list of one or more frequencies (and possibly RATs) on which to search for alternative cells.

Processing circuitry 36 checks whether the entire search list has been exhausted, at a list checking operation 80.

If all the frequencies on the search list have been tested but a suitable alternative cell has not been found, the processing circuitry declares failure, and method terminates at a failure termination operation 84. In an alternative embodiment, before declaring failure, the processing circuitry returns to the frequency/RAT of the serving cell and tries to complete the call establishment procedure with the serving cell. Only if the latter attempt fails, the processing circuitry declares failure at operation 84.

Otherwise, the processing circuitry searches for an alternative cell on the next frequency on the search list, at a search operation 88. The processing circuitry checks whether a suitable cell is found on the currently searched frequency, at a cell checking operation 92. If not found, the method loops back to operation 80 above. If a suitable alternative cell is found, the processing circuitry reselects to this cell, at a reselection operation 96. The method then loops back to operation 60 above in which the processing circuitry establishes the call via the alternative cell (which is now the serving cell). As noted above, the method of FIG. 2 is performed autonomously by UE 24 without coordination with the serving cell.

The example flow of FIG. 2 refers to an embodiment in which the UE re-allocates all of its time for searching on other frequencies. As noted above, in alternative embodiments the UE allocates only part of its time resources for searching for an alternative cell. In an example embodiment, after failing to find a suitable cell on a certain searched frequency at operation 92, the processing circuitry re-checks whether communication quality with the serving cell has improved. In another example embodiment, the processing circuitry re-checks for improvement in communication quality with the serving cell after searching over N alternative frequencies (wherein N is typically configurable).

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    in a mobile communication terminal, detecting a degradation in communication quality between the mobile communication terminal and a serving base station during a call-setup procedure in which the terminal attempts to establish a call via the serving base station, wherein the call-setup procedure begins with the mobile communication terminal sending a "Radio Resource Control (RRC) connection request" message to the serving base station and ends with the mobile communication terminal sending an "RRC connection setup complete" message to the serving base station, and wherein the call-setup procedure specifies that the mobile communication terminal is to dedicate all time resources for establishing the call with the serving base station;
    responsive to detecting the degradation in the communication quality, searching by the mobile communication terminal, during the call-setup procedure with the serving base station, for an alternative base station that is suitable for establishing the call, even though the call-setup procedure specifies that all time resources of the mobile communication terminal are to be dedicated for establishing the call with the serving base station; and
    upon finding the alternative base station, switching to establish the call via the alternative base station.

2. The method according to claim 1, wherein searching for the alternative base station comprises attempting to receive the alternative base station in at least one time interval that is uncoordinated with the serving base station.

3. The method according to claim 1, wherein searching for the alternative base station comprises continuing to attempt the call-setup procedure via the serving base station in parallel with searching for the alternative base station.

4. The method according to claim 3, comprising, in response to recovery of the degradation, aborting searching for the alternative base station and reverting to establish the call via the serving base station.

5. The method according to claim 1, wherein searching for the alternative base station comprises aborting the call-setup procedure via the serving base station.

6. The method according to claim 1, wherein searching for the alternative base station comprises switching from a frequency used for receiving the serving base station to an alternative frequency for receiving the alternative base station.

7. The method according to claim 6, wherein switching to the alternative frequency comprises switching to an alternative frequency band.

8. The method according to claim 1, wherein searching for the alternative base station comprises switching from a Radio Access Technology (RAT) used for communicating with the serving base station to an alternative RAT for receiving the alternative base station.

9. The method according to claim 1, wherein detecting the degradation in the communication quality comprises detecting that a reception quality of a signal transmitted by the serving base station is below a predefined quality threshold for more than a predefined time duration.

10. The method according to claim 1, wherein detecting the degradation in the communication quality comprises detecting that the call-setup procedure via the serving base station does not complete within a predefined time duration.

11. The method according to claim 1, wherein detecting the degradation in the communication quality comprises detecting that an error rate of a signal transmitted by the serving base station is above a predefined error-rate threshold.

12. An apparatus, comprising:
a transceiver, which is configured to communicate with base stations; and
processing circuitry, which is configured to:
  detect a degradation in communication quality with a serving base station during a call-setup procedure in which the transceiver attempts to establish a call via the serving base station, wherein the call-setup procedure begins with the transceiver sending a "Radio Resource Control (RRC) connection request" message to the serving base station and ends with the transceiver sending an "RRC connection setup complete" message to the serving base station, and wherein the call-setup procedure specifies that the transceiver is to dedicate all time resources for establishing the call with the serving base station,
  search, during the call-setup procedure via the serving base station, for an alternative base station that is suitable for establishing the call, even though the call-setup procedure specifies that all time resources of the transceiver are to be dedicated for establishing the call with the serving base station, and,
  upon finding the alternative base station, switch to establish the call via the alternative base station.

13. The apparatus according to claim 12, wherein the processing circuitry is configured to attempt to receive the alternative base station in at least one time interval that is uncoordinated with the serving base station.

14. The apparatus according to claim 12, wherein the processing circuitry is configured to continue to attempt the call-setup procedure via the serving base station in parallel with searching for the alternative base station.

15. The apparatus according to claim 12, wherein the processing circuitry is configured to abort the call-setup procedure via the serving base station when searching for the alternative base station.

16. The apparatus according to claim 12, wherein the processing circuitry is configured to search for the alternative base station by performing at least one of:
  switching from a frequency used for receiving the serving base station to an alternative frequency for receiving the alternative base station; and
  switching from a Radio Access Technology (RAT) used for communicating with the serving base station to an alternative RAT for receiving the alternative base station.

17. A mobile communication terminal comprising the apparatus of claim 12.

18. A chipset for processing signals in a mobile communication terminal, comprising the apparatus of claim 12.

* * * * *